United States Patent
Azuma et al.

[11] Patent Number: 5,971,800
[45] Date of Patent: Oct. 26, 1999

[54] CONNECTOR ASSEMBLY WITH ALTERNATE HOUSINGS WITH AND WITHOUT POWER CONTACTS

[75] Inventors: Yoichiro Azuma, Tokyo; Yasuhiro Ono, Kanagawa; Shigenori Koike, Tokyo, all of Japan

[73] Assignee: KEL Corporation, Tokyo, Japan

[21] Appl. No.: 09/050,800

[22] Filed: Mar. 30, 1998

[30] Foreign Application Priority Data

Apr. 9, 1997 [JP] Japan ................................. 9-090683

[51] Int. Cl.⁶ .................................................. H01R 11/00
[52] U.S. Cl. ........................................... 439/502; 439/108
[58] Field of Search .................... 439/108, 502, 439/218, 221

[56] References Cited

U.S. PATENT DOCUMENTS

| | | | |
|---|---|---|---|
| 5,139,426 | 8/1992 | Barkus et al. | 439/108 |
| 5,234,353 | 8/1993 | Scholz et al. | 439/289 |
| 5,295,843 | 3/1994 | Davis et al. | 439/108 |
| 5,360,349 | 11/1994 | Provencher et al. | 439/108 |
| 5,538,435 | 7/1996 | Yohn | 439/188 |

*Primary Examiner*—Renee S. Luebke
*Assistant Examiner*—Hae Moon Hyeon
*Attorney, Agent, or Firm*—Robert W. J. Usher

[57] ABSTRACT

An electrical connector assembly comprises a plug connector half 1 and receptacle connector halves 5 and 9, including a receptacle connector half 5 with power transmission contacts and a receptacle connector half 9 without any power transmission contact. These receptacle connector halves are alternatively used in correspondence with the application. The receptacle connector half 5 with power transmission contacts is provided with two polar receptacle contacts 70 for power transmission in a receptacle housing 50. These receptacle contacts 70 for power transmission are brought into contact with plug contacts 30 for power transmission when the plug connector half 1 and the receptacle connector half 5 are intermated. On the other hand, the receptacle connector half 9 without any power transmission contacts is provided with accommodation spaces 57 in a receptacle housing 50'. These accommodation spaces accommodate said plug contacts 30 for power transmission when the plug connector half 1 and the receptacle connector half 9 are intermated.

3 Claims, 10 Drawing Sheets

5,971,800

CONNECTOR ASSEMBLY WITH ALTERNATE HOUSINGS WITH AND WITHOUT POWER CONTACTS

RELATED APPLICATIONS

This application claims the priority of Japanese Patent Application No. 9-90683 filed on Apr. 9, 1997, which is incorporated herein by reference.

FIELD OF THE INVENTION

The present invention generally relates to an electrical connector assembly of the type having two intermatable, plug and receptacle connector halves; and more particularly to such electrical connector in which each connector half has electrical contacts for signal transmission and for power transmission.

BACKGROUND OF THE INVENTION

Generally, laptop computers are designed with a connector, through which an external storage device such as FD drive and CD-ROM drive can be removably connected. In many cases, such laptop computers are also equipped with a rechargeable battery (i.e., a battery pack) for use as a power source. Therefore, the laptop computers need a connector with a plurality of electrical contacts, which is to be used for signal transmission with an external device, and a connector with electrical contacts for power transmission which require a larger capacity than those used for signal transmission, to allow current flow.

There is a yet sophisticated design of laptop computer which houses an attachment, i.e, an external device, a battery pack, etc. in the main body of the laptop computer. There is such type of laptop computer which enables alternative or exchangeable connection of an attachment, instead of allowing a plurality of attachments to be housed in the main body. In this way, the size of the laptop computer can be minimized for portability. In this design, each attachment is constructed with the same outside dimensions, and a receptive space for the insertion of an attachment is provided in the main body of the computer. A connector is provided in this receptive space to enable the removable connection of the attachment to the computer, such that the user can operate the laptop computer comfortably with a right attachment for his current need just by inserting or exchanging the attachment accordingly.

Such attachments include an external memory device, which does not require contacts for power transmission, and a battery pack, which requires electrical contacts that allow current flow. When the laptop computer is constructed in the above mentioned design to enable exchangeable insertion of attachment devices, electrical connectors, one connector for signal transmission and the other for power transmission (e.g., in two rows, one above the other), are provided at different locations in the receptive space.

Lately, the laptop computers have undergone further miniaturization, and it is becoming difficult to provide a plurality of electrical connectors in the receptive space. This has lead to a design of universal electrical connector, in which a single connector provided in the receptive space of the laptop computer is used both as signal connector and power connector, thus enabling the removable and exchangeable connection of an attachment in accordance with the present need. However, the electrical contacts of this type of connector are arranged in a special way. For example, two electrical contacts for power transmission are provided at the lateral ends of a row of electrical contacts for signal transmission.

In this type of connector, the single design of connector is used commonly for various attachments, even the attachments which do not require power supply are equipped with electrical contacts designed for power transmission. As far as the cost of the connector is concerned, it is unwise to provide such unnecessary contacts, and it is also disadvantageous in pricing the attachments.

SUMMARY OF THE INVENTION

The present invention was conceived to solve these problems. It is an object of the present invention to provide an electrical connector assembly which occupies a small space and which can be produced with relatively low cost.

It is another object of the present invention to provide a connector assembly which is applicable both to a device that requires electrical contacts only for signal transmission and to a device that requires electrical contacts for signal transmission and for power transmission.

In order to attain these objects, the present invention provides an electrical connector which comprises a plug connector half having a plurality of vertically extending plug contacts for signal transmission that are retained in a laterally extending row in a plug housing and a receptacle connector half having a plurality of vertically extending receptacle contacts for signal transmission that are retained in a laterally extending row in a receptacle housing. The plug connector half and receptacle connector half are intermated to establish the electrical connection of these plug and receptacle contacts for signal transmission.

In addition, the plug connector half is provided with two polar plug contacts for power transmission, which are positioned next to the lateral ends of the row of the plug contacts for signal transmission.

On the other hand, the receptacle connector half comprises a receptacle connector half with power transmission contacts and a receptacle connector half without any power transmission contact, and these receptacle connector halves are alternatively used in accordance with the application. The receptacle connector half with power transmission contacts are provided with two polar receptacle contacts for power transmission, which are positioned next to the lateral ends of the row of the receptacle contacts for signal transmission. These receptacle contacts for power transmission are brought into contact with the plug contacts for power transmission when the receptacle connector half and the plug connector half are intermated. On the other hand, the receptacle connector half without any power transmission contact is not provided with any receptacle contact for power transmission, so the vacant spaces are left in the receptacle housing. These spaces are used to accommodate the plug contacts for power transmission when the plug connector half and the receptacle connector half are intermated.

In this design, both the receptacle connector halves can be constructed with an identical housing. Furthermore, the spaces in the housing of the receptacle connector half with power transmission contacts which are for retaining the receptacle contacts for power transmission are used as spaces for accommodating the plug contacts for power transmission in the receptacle connector half without any power transmission contact.

In this construction, the contacts for signal transmission and the contacts for power transmission are aligned in a laterally extending row. As a result, even with these power transmission contacts, it is possible to miniaturize the connector assembly. Furthermore, if there is no need of power supply for the attachment, the receptacle connector half with power transmission contacts can be simply removed from the receptacle contacts used for power transmission, which condition is the receptacle connector half without any power transmission contact. As the identical receptacle housing is shared by these two receptacle connector halves, the production cost of the connector assembly is relatively low.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
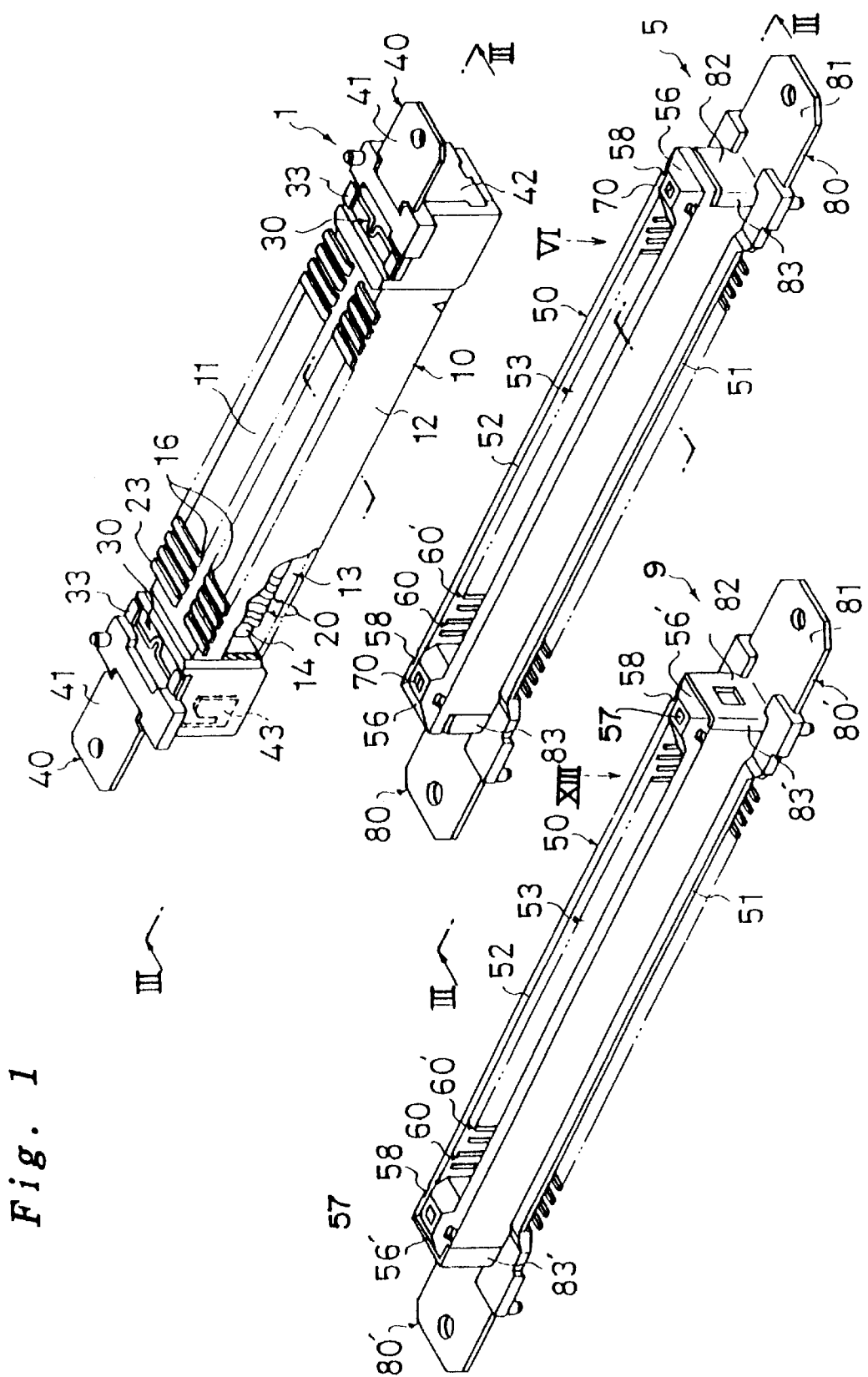
FIG. 1 shows a perspective view of a connector assembly comprising receptacle connector halves and a plug connector half as a preferred embodiment of the present invention.

A connector assembly forming a preferred embodiment of the present invention is shown in FIG. 1, etc. This connector assembly comprises a plug connector half 1 and two receptacle connector halves: a receptacle connector half 5 with power transmission contacts and another receptacle connector half 9 without any power transmission contact. These receptacle connector halves 5 and 9 are alternatively matable with the plug connector half 1 so that the electrical contacts 60 and 70 of either the receptacle connector half 5 or the receptacle connector half 9 shall come into contact with the electrical contacts 20 and 30 of the plug connector half 1.

Figure 2:
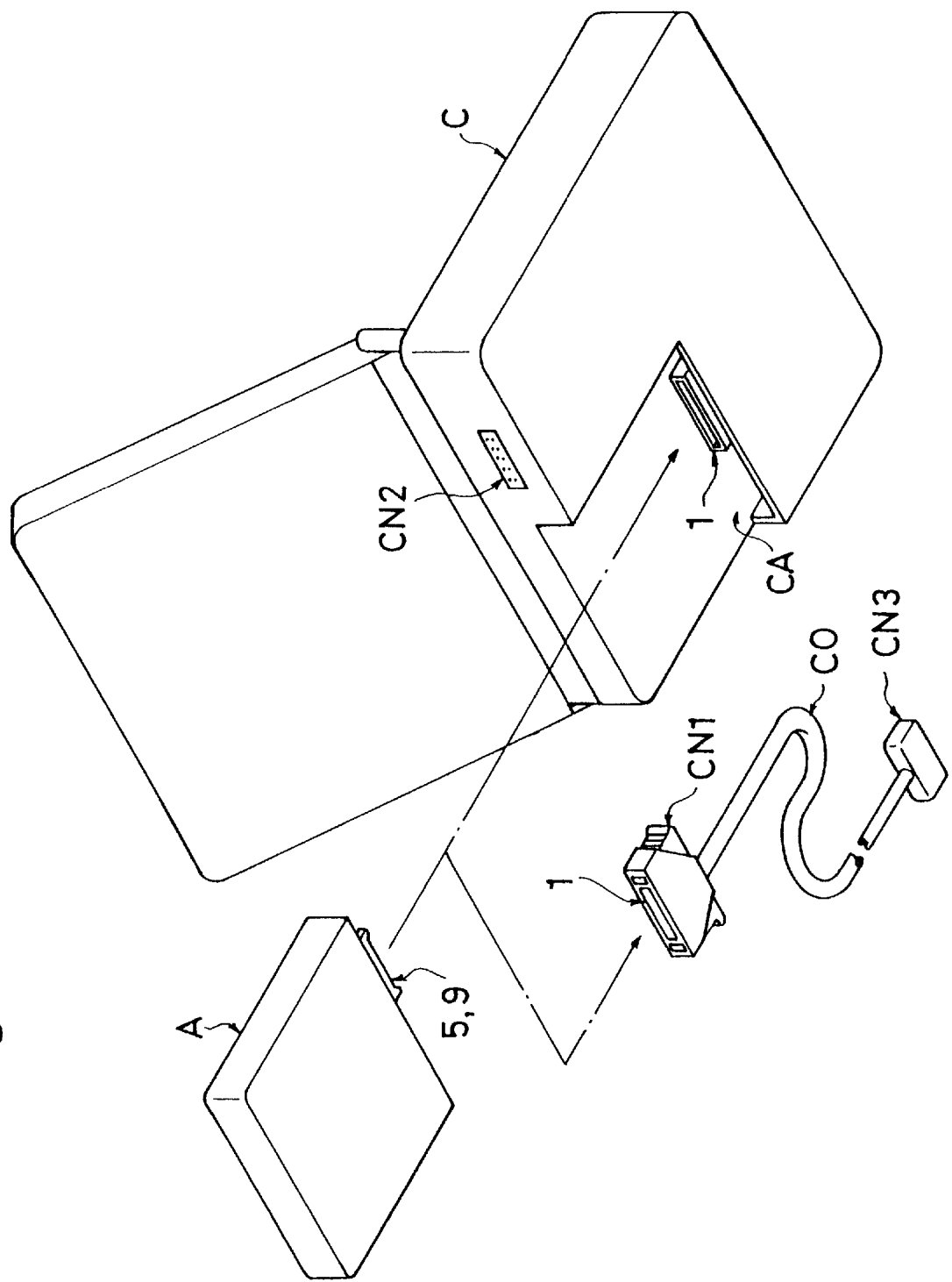
FIG. 2 shows a perspective view of a laptop computer and an attachment to which the connector assembly is provided.

As shown in FIG. 2, the plug connector half 1 is provided in the attachment receiving space CA of a laptop computer C. This attachment receiving space CA is designed to accept an attachment A which is provided with either the receptacle connector half 5 or the receptacle connector half 9 in accordance with the functional requirements of the attachment. This attachment can be a battery pack, a CD-ROM drive, or an HD drive, which is selectively attached to the laptop computer C upon the user's choice.

Figure 4:
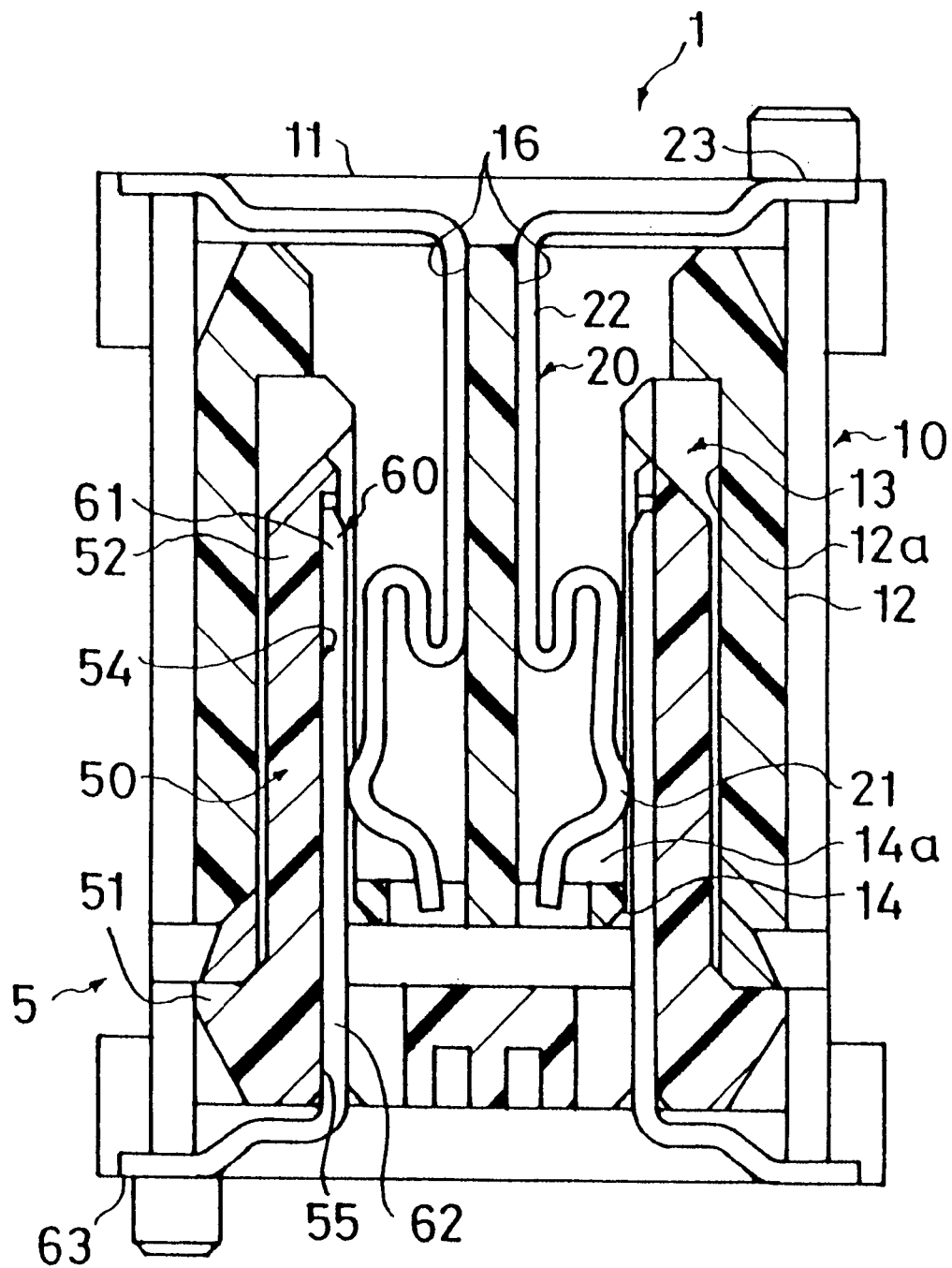
FIG. 4 shows a sectional view of the plug connector half and one of the receptacle connector halves mated with each other, taken along line IV—IV in FIG. 3.
Figure 5:
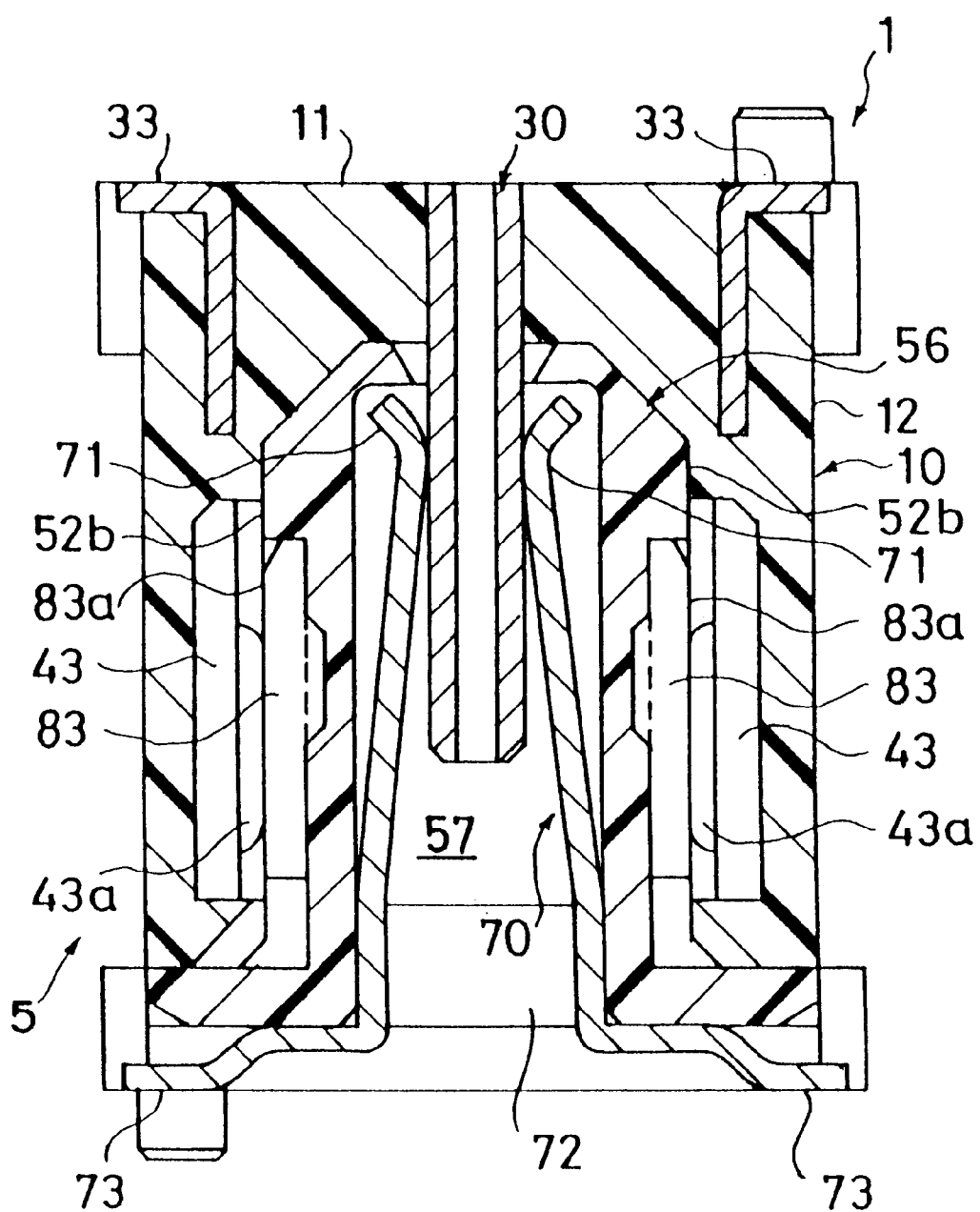
FIG. 5 shows a sectional view of the connector assembly in engagement, taken along line V—V in FIG. 3.
Figure 12:
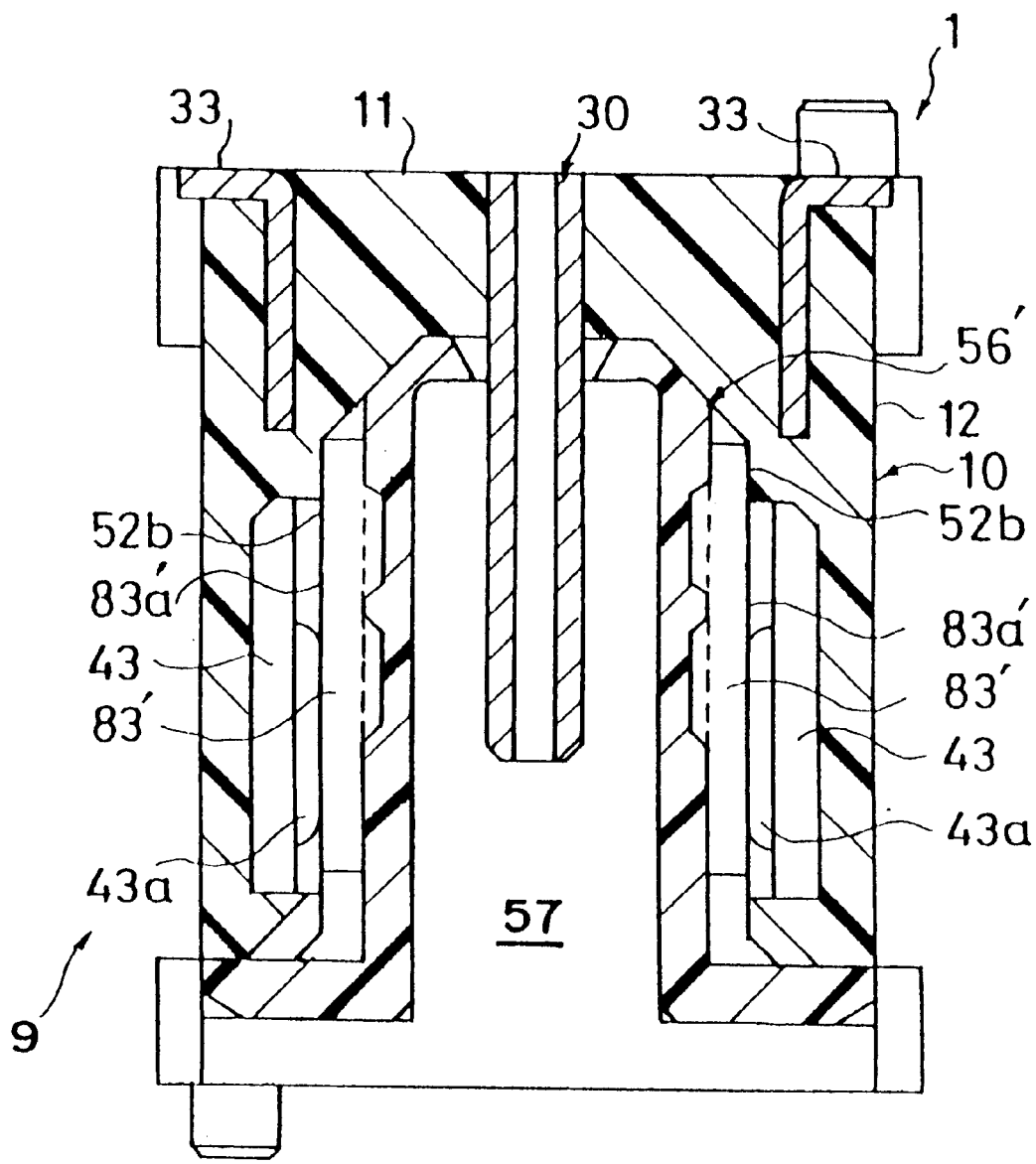
FIG. 12 shows a sectional view of the connector assembly in engagement with the other receptacle connector half, which corresponds with the view taken along line V—V in FIG. 3.
Figure 13:
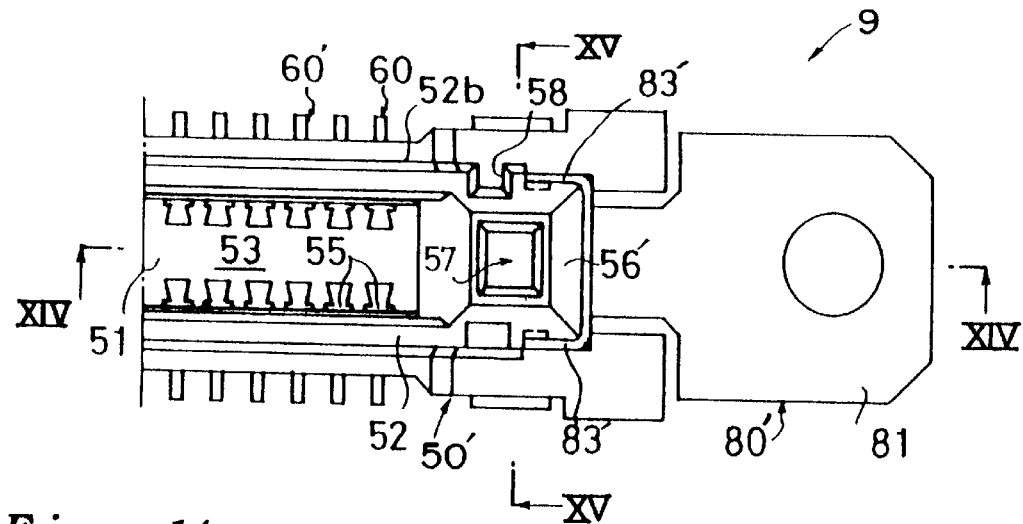
FIG. 13 shows a partially enlarged top view of the receptacle connector half.
Figure 14:
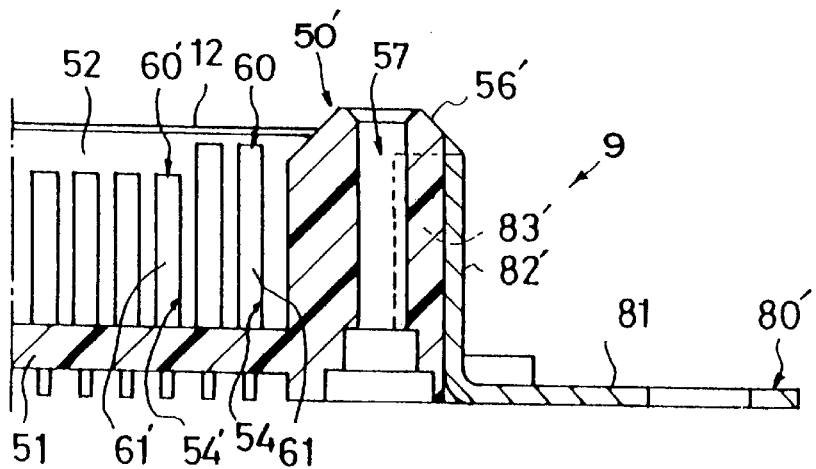
FIG. 14 shows a sectional view of the receptacle connector half, taken along line XIV—XIV in FIG. 13.
Figure 15:
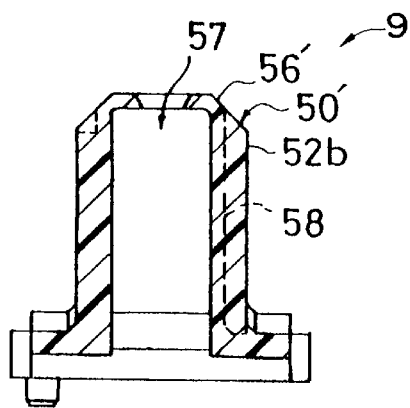
FIG. 15 shows a sectional view of the receptacle connector half, taken along line XV—XV in FIG. 13.

As both the receptacle connector halves 5 and 9 are constructed matable with the plug connector half 1, any attachment A which is provided with either the receptacle connector half 5 with power transmission contacts or the receptacle connector half 9 without any power transmission contact can be mounted into the attachment receiving space CA of the laptop computer. In the following paragraphs, each connector half is described in detail with reference to the respective drawings. FIGS. 4, 5 and 12 show the views of the connector assembly in engagement, and the others show the views of individual connector halves 1, 5 and 9 in disengagement.

First, the plug connector half 1 is described. The plug connector half 1 has a plurality of plug contacts 20 retained in a housing 10 formed of an insulative material as shown in the figures. This plug housing 10 is integrally formed as a one-piece body having a rectangular base portion 11, a rectangular outer wall portion 12 upstanding therefrom downward, and a rectangular plug contact retaining portion 14 extending from the base portion 11 inside the outer wall portion 12. As a result, on the lower side of the base portion 11, an annular plug outer cavity 13 is created between the outer wall portions 12 and the plug contact retaining portion 14, opening downward in the direction of engagement.

Two rows of longitudinally aligned apertures 16 are formed in the part of the base portion 11, extending along the plug contact retaining portion 14, and a plurality of guide grooves 14a are formed on respective opposite sides of the plug contact retaining portion 14 at locations corresponding to the apertures 16. As a result, when the apertures 16 are provided with plug contacts 20 stitched therein from the upper face of the housing, the upper portions of the plug contacts 20 are led into the guide grooves 14a.

Figure 9:
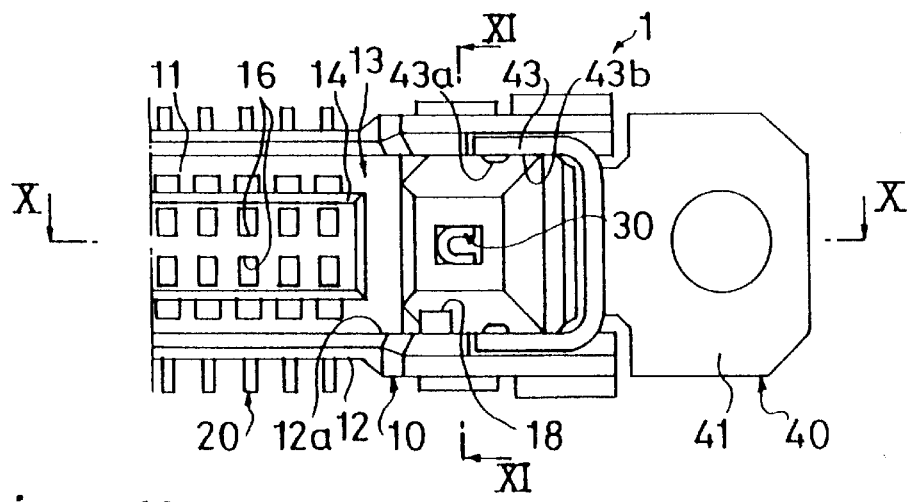
FIG. 9 shows a partially enlarged view of the plug connector half, in the direction indicated with arrow IX in FIG. 3.
Figure 10:
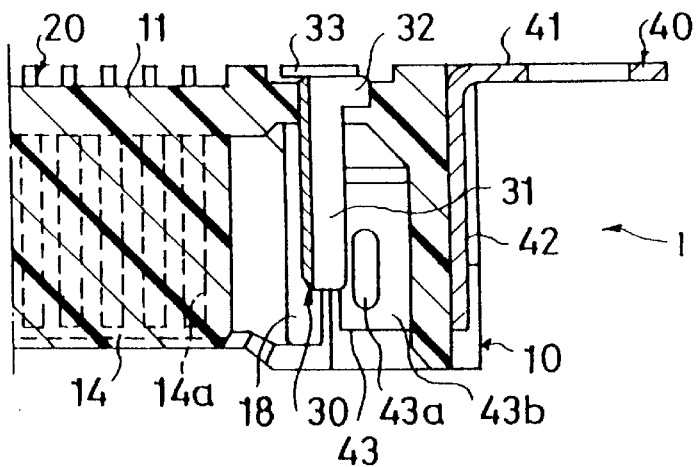
FIG. 10 shows a sectional view of the plug connector half, taken along line X—X in FIG. 9.
Figure 11:
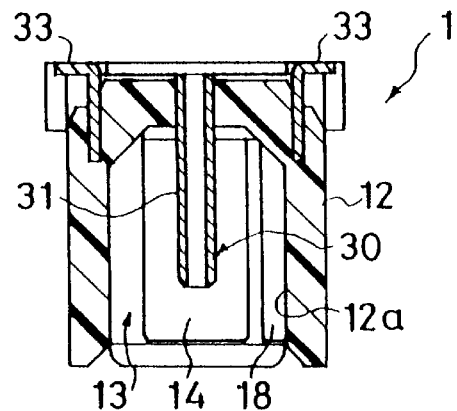
FIG. 11 shows a sectional view of the plug connector half, taken along line XI—XI in FIG. 9.

Two positioning keys 18 and 18 are integrally formed in the plug outer cavity 13, extending vertically on the rear inside face 12a of the outer wall portion 12 near the respective longitudinal ends of the plug housing 10 (only the right side is shown in FIG. 9, 10 and 11).

Each plug contact 20 is formed of an electrically conductive material and includes a contact portion 21 guided by a corresponding guide groove 14a and facing the plug outer cavity 13, an anchoring portion 22 stitched into and retained in a corresponding aperture 16, and a lead portion 23 extending horizontally from the anchoring portion 22 and bent in an extended "Z" figure. The contact portions 21 are provided with some resiliency in the direction outward, and their lower ends are bent inward. As a result, the receptacle connector half 5 with power transmission contacts or the receptacle connector half 9 without any power transmission contact, which will be described later, can be easily mated.

As shown in FIG. 9 to 11, plug contacts 30 for power transmission are provided to the right and to the left of the plug contact retaining portion 14 in the plug outer cavity 13. Each plug contact for power transmission 30 has a contact portion 31 having a "U" cross section, which extends downward toward in the direction of the opening of the plug housing 10, an anchoring portion 32 which is continuous upward from and wider than the contact portion 31 toward a respective longitudinal end, and a lead portion 33 which extends horizontally from the anchoring portion 32.

Furthermore, metallic plug fixing plates 40 and 40 are provided to the plug housing 10 at the right and left longitudinal ends. These fixing plates 40 and 40 are used to fix the plug housing 10 on a printed circuit board K1, which is to be mounted in the laptop computer C. They are also used to ground the printed circuit board K1 when the plug connector half 1 is mated with the receptacle connector half 5 or 9. Therefore, these fixing plates 40 of the plug connector half 1 come into contact with the fixing plates 80 or 80' of the receptacle housing 50 or 50' when the connector assembly is brought into engagement.

Each plug fixing plate 40 comprises a flat portion 41, a descending portion 42 which extends downward from the flat portion 41, and a holding portion 43 which extends laterally at the lower end of the descending portion 42 and bends in a "U" cross section in a plan view. Contacting points 43a are provided protruding inward on the inside surfaces of these holding portions 43. The plug fixing plates 40 constructed in this fashion are mounted on the plug housing 10 with the holding portions 43 holding the plug housing 10.

In this condition, the contacting points 43a of the holding portions 43 of the plug fixing plates 40 extrude into the plug outer cavity 13 as the outer wall portion 12 is formed with cuts whose locations correspond to those of the holding portions 43, respectively. Therefore, each inside face 43b of the holding portions 43 is in the same plane with a respective inside face 12a of the. outer wall portion 12. Moreover, through-holes are provided in the flat portions 41 of the plug fixing plates 40, which can be used for fixing the plug housing onto the printed circuit board.

When the plug connector half 1 is mounted on the printed circuit board K1, the lead portions 23 of the plug contacts 20 are placed on and soldered to the respective signal pathways of the circuit pattern provided on the printed circuit board K1, and the lead portions 33 of the plug contacts 30 for power transmission are placed on and soldered to the respective power transmission pathways of the circuit pattern. Likewise, the flat portions 41 of the plug fixing plates 40 are placed on the respective grounding pathways of the circuit pattern or to the housing of the laptop computer for grounding. Then, the plug housing 10 is fixed on the printed circuit board K1 by putting screws N through the through-holes of the flat portions 41.

Figure 3:
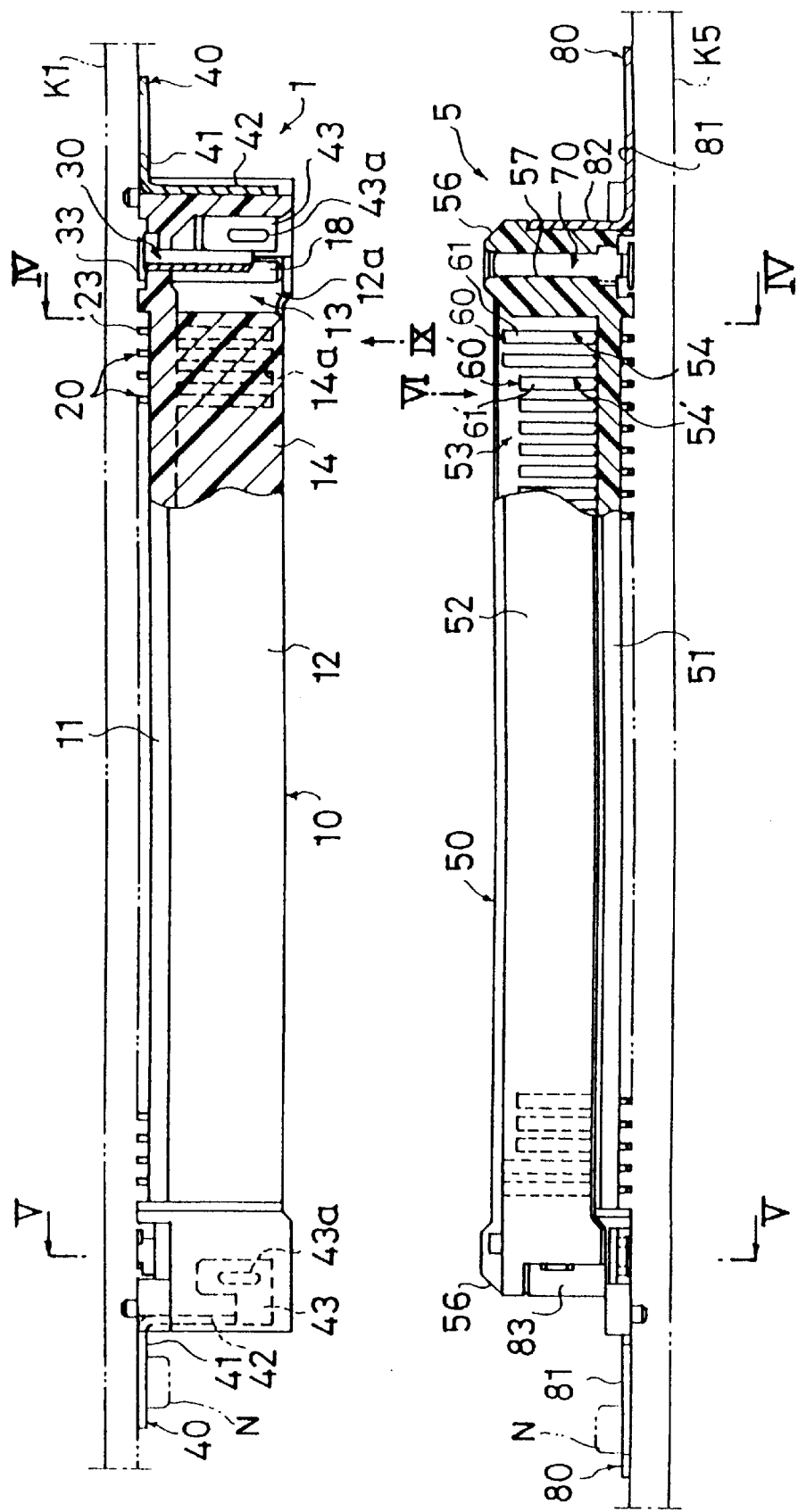
FIG. 3 shows a sectional view of the connector assembly, taken along line III—III in FIG. 1.

Now, the receptacle connector half 5 with power transmission contacts is described. As shown in FIG. 3, etc., this receptacle connector half 5 comprises a plurality of receptacle contacts 60 and 60' retained in a receptacle housing 50 formed of an electrically insulative material. The receptacle housing 50 is integrally formed as a one-piece body having a rectangular base portion 51 and a rectangular side wall portion 52 upstanding therefrom forming a receptacle cavity 53 opening upward in the direction of engagement. Guiding protrusions 56 and 56, each having a shape of rectangular pyramid with a flat top, are provided at the right and left ends of the side wall portion 52.

Two longitudinally extending rows of apertures 55 are formed through the base portion 51 in communication with the receptacle cavity 53. As shown in the figures, a plurality of guide grooves 54 and 54' are formed on the inner major surfaces of the side wall portion 52, aligned with respective apertures 55, so that the receptacle contacts 60 and 60' staked into the apertures 55 are guided and inserted into the guide grooves 54 and 54'. The contact portions 61 of the receptacle contacts 60 are inserted into the guide grooves 54, and the contact portions 61' of the receptacle contacts 60' are inserted into the guide grooves 54'. The guide grooves 54 and 54' have the same cross section, but the length of the guide grooves 54' is shorter than that of the guide grooves 54. The receptacle contacts 60 and 60' will be described in detail, later.

Positioning grooves 58 are provided extending vertically on the rear face 52b of the side wall portion 52 near the right and left ends. These grooves 58 and 58 are so positioned that when the receptacle connector half 5 and the plug connector half 1 are mated with each other, the two positioning keys 18 and 18 of the plug connector half are smoothly inserted into the positioning grooves 58.

Each receptacle contact 60 has a contact portion 61 guided by a respective guide groove 54 to face the receptacle cavity 53, an anchoring portion 62 staked into and retained in a respective aperture 55, and a lead portion 63 extending horizontally outward from the anchoring portion 62 and bent in an extended "Z" figure. On the other hand, each receptacle contact 60' has a contact portion 61' which is shorter than that of the receptacle contact 60 while the anchoring portion and the lead portion of each receptacle contact 60' are constructed with the same dimensions. Both the receptacle contacts 60 and 60' are made of an electrically conductive material.

Figure 6:
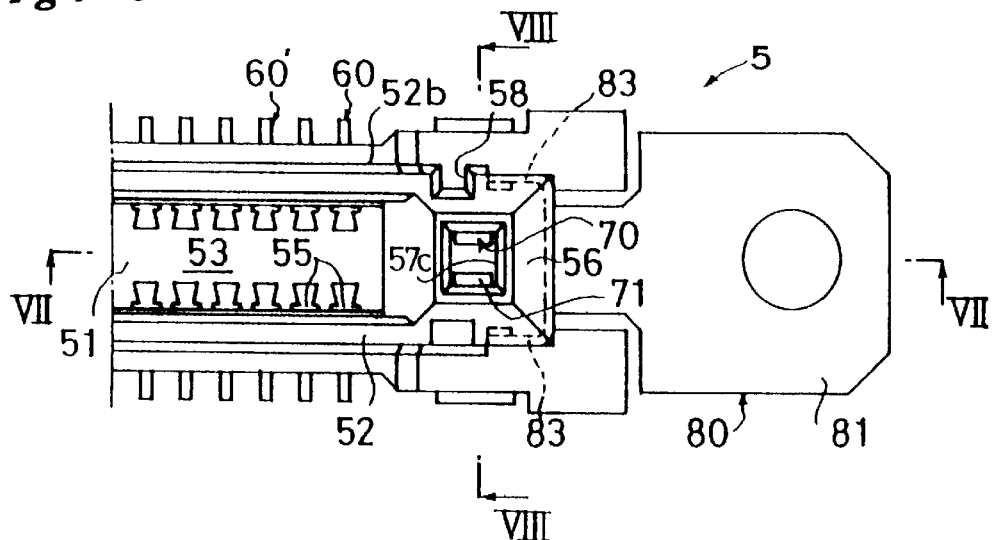
FIG. 6 shows a partially enlarged view of a receptacle connector half, in the direction indicated with arrow VI in FIG. 3.
Figure 7:
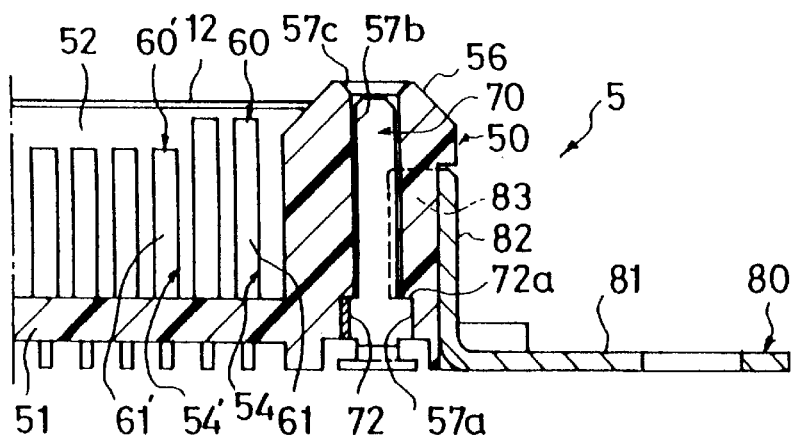
FIG. 7 shows a sectional view of the receptacle connector half, taken along line VII—VII in FIG. 6.
Figure 8:
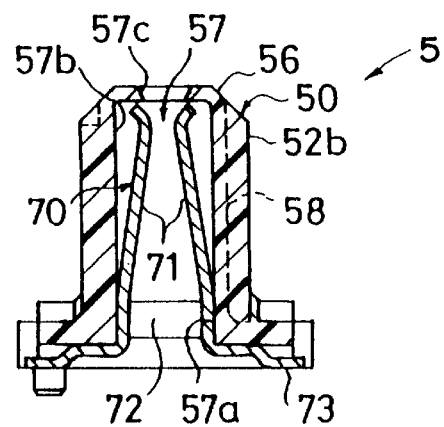
FIG. 8 shows a sectional view of the receptacle connector half, taken along line VIII—VIII in FIG. 6.

As shown in FIGS. 6 through 8, a slot 57 for retaining a power transmission contact is provided through each guiding protrusion 56 from the base 51 to the upper face. Each power contact retaining slot 57 comprises a contact retaining portion 57a located at the lower portion of the slot and an upper hole 57b located above the contact retaining portion 57a. Furthermore, each upper hole 57b is continuous to an insertion slot 57c which is provided in the upper end portion of the respective guiding protrusion 56.

These power contact retaining slots 57 retain receptacle contacts 70 for power transmission which are inserted thereinto. Each contact 70 for power transmission is made of a plate of electrically conductive material and comprises identical contact portions 71 and 71 which face each other in the forward and backward direction, a connecting portion 72 which combines the lower portions of these contact portions 71 and 71, and lead portions 73 and 73 which extend in the forward and backward direction and bend in an extended "Z" figure below the connecting portion 72 outward. The upper portions of the contact portions 71 and 71 are bent inward and then outward to open at the upper end so that the plug contacts 30 for power transmission of the plug connector half are easily insertable into the receptacle contacts for power transmission of the receptacle connector half.

The lateral dimension of the contact retaining portions 57a of the power contact retaining slots 57 is larger than the lateral dimension of the upper holes 57*b*, and the lateral width of the contact portions 71 and 71 of the receptacle contacts 70 for power transmission is smaller than the width of the upper holes 57*b*. In addition, the width of the connecting portions 72 is determined such that the connecting portions 72 can be press-fit into and retained in the contact retaining portions 57*a*. Therefore, the receptacle contacts 70 for power transmission are inserted from the lower face of the receptacle housing 50 into the power contact retaining slots 57 until the upper ends 72*a* of the connecting portions 72 meet the upper surfaces of the contact retaining portions 57*a*. After the insertion, the receptacle contacts 70 for power transmission are retained there securely.

Furthermore, metallic receptacle fixing plates 80 and 80 are provided to the receptacle housing 50 at the right and left longitudinal ends. These fixing plates 80 and 80 are used to fix the receptacle housing 50 on a printed circuit board K5, which is to be mounted in the attachment A and to ground the printed circuit board K5. Each receptacle fixing plate 80 comprises a flat portion 81, an ascending portion 82 which extends vertically upward from the flat portion 81, and a holding portion 83 which extends laterally at the upper ends of the ascending portion 82 and bends in a "U" cross section in a plan view.

These receptacle fixing plates 80 are mounted on the receptacle housing 50 by caulking the holding portions 83 of the receptacle fixing plates 80 after fitting the holding portions 83 to the respective right and left ends of the housing 50. In this condition, the outside faces 52*b* of the side wall portion 52 of the housing come into the same plane with the outside faces 83*a* of the holding portions 83 of the fixing plates. Moreover, through-holes are provided in the flat portions 81 in the same way as the flat portions 41 of the plug fixing plates 40.

When this receptacle connector half 5 with power transmission contacts is mounted on the printed circuit board K5, the lead portions 63 and 63' of the receptacle contacts 60 and 60' are placed on and soldered to the respective signal pathways of the circuit pattern provided on the circuit board K5, and the lead portions 73 of the receptacle contacts 70 for power transmission are placed on and soldered to the respective power transmission pathways of the circuit pattern. Likewise, the flat portions 81 of the receptacle fixing plates 80 are placed on the respective grounding pathways of the circuit pattern of the printed circuit board K5 or to the housing of the attachment for grounding, and the receptacle housing 50 is fixed on the printed circuit board K5 by putting screws N through the through-holes of the flat portions 81.

If the receptacle connector half 5 with power transmission contacts is applied to a battery pack, i.e., an attachment A, the receptacle contacts 70 and 70 for power transmission located at the longitudinal ends and a few of the receptacle contacts 60 and 60' are soldered to the printed circuit board K5 of the battery pack. When this battery pack is attached to the laptop computer C by mating the receptacle connector half 5 of the attachment with the plug connector half 1 of the laptop computer, power is supplied to the laptop computer C through the power transmission contacts 30 and 70, and at the same time, such signals as to indicate the remaining charge of the battery pack on the laptop computer can be transmitted through these contacts for signal transmission.

For safety in the mating of the plug and receptacle connector halves 1 and 5, the positioning keys 18 and 18 are provided in the backside of the plug housing 10, and the positioning grooves 58 and 58 are provided in the backside of the receptacle housing 50. Therefore, accidental insertion with one connector half incorrectly aligned with respect to the other (up-side down or 180° misalignment) is prevented.

For easy mating of the connector halves, the receptacle connector 5 with power transmission contacts are provided with the guiding protrusions 56 near the longitudinal ends of the housing. When the receptacle connector half 5 is brought close to the plug connector half 1 even while the receptacle cavity 53 is not positioned to the plug contact retaining portion 14, the receptacle cavity 53 is shifted automatically to the insertion position (i.e., the position where the positioning keys 18 and 18 meet the positioning grooves 58 and 58) with respect to the plug contact retaining portion 14 as the slant faces of the guiding protrusions 56 hit the right and left ends of the outer wall portion 12 of the plug connector half.

In the mating of the plug and receptacle connector halves 1 and 5, the existence of the positioning keys 18 and the positioning grooves 58 prevents the accidental polarity (+/−) interchange between the power transmission contacts 30 and 70, which are provided at the right and left ends of the connector halves 1 and 5. Also, it prevents incorrect or slanted insertion of the receptacle connector half 5 into the plug connector half 1.

When the plug and receptacle connector halves 1 and 5 are brought into engagement, the plug contacts 20 and the receptacle contacts 60 and 60' come into contact. As mentioned above, the positioning keys 18 and the positioning grooves 58 function to make the plug housing 10 enter the receptacle housing 50 in a straight direction. Therefore, it is made certain that the receptacle contacts 60 come into contact with the plug contacts 20 before the receptacle contacts 60' do as the contact portions 61 of the receptacle contacts 60 are longer than the contact portions 61' of the receptacle contacts 60'.

Thus, the receptacle contacts 60, whose contact portions 61 are longer, are used for the transmission of signals which should be turned on first or cut off last when the connector halves are engaged or disengaged with each other. On the other hand, the receptacle contacts 60', whose contact portions 61' are shorter, are used for the transmission of other signals. In this way, electrical connections with a time difference, i.e., a sequential connection of the contacts, is assured.

In the above embodiment, the plug contacts 20 and the receptacle contacts 60 and 60' are used only for the transmission of signals. The present invention is not limited to this design. Beside the power transmission contacts 30 and 70, or together with the power transmission contacts 30 and 70, some of the plug contacts 20 and the receptacle contacts 60 and 60' can be used for connecting the power transmission.

In the above embodiment, the fixing plates 40 and 80 of the plug and receptacle connector halves are used for improving the grounding and for shielding noise. However, these fixing plates can be used for providing additional contacts for power transmission in addition to the power transmission contacts 30 and 70. With this design, in case that the power transmission through the power transmission contacts 30 and 70 becomes insufficient, additional power can be supplied through the fixing plates 40 and 80.

In the above embodiment, the plug fixing plates 40 and the receptacle fixing plates 80 are used for electrically connecting the housing of the laptop computer C and the housing of the battery pack. Through this connection, the electrical potential difference between the housing of the laptop computer C and the housing of the battery pack is made zero (i.e., making these housings isopotential), thus reducing the occurrence of noise.

Now, with reference to FIGS. 12 to 15, the receptacle connector half 9 without any power transmission contact is described as used in a CD-ROM drive, i.e., an example of attachment A, excluding battery packs. The basic construction of this receptacle connector half 9 without any power transmission contact is identical with that of the receptacle connector half 5 with power transmission contacts, and the only fundamental difference is that the receptacle connector half 9 without any power transmission contact does not have any receptacle contact 70 for power transmission.

As shown in FIG. 1 and FIGS. 12 to 15, in this receptacle connector half 9 without any power transmission contact, the receptacle fixing plates 80' and 80' are press-fit into the receptacle housing 50' unlike the receptacle fixing plates 80, which are described previously. Therefore, the configurations of the housing 50' and of the fixing plates 80' and 80' are a little different from those of the housing 50 and of the fixing plates 80 and 80. However, this difference is only about how the fixing plates are mounted on the housing, and the receptacle housings 50 and 50' are practically identical with each other in construction and function. Therefore, the receptacle connector half 5 with power transmission contacts and the receptacle connector half 9 without any power transmission contact can share the identical housing 50 or 50' (i.e., the fixing plates 80 and 80 can also be press-fit into the housing 50 in the receptacle connector half 5 with power transmission contacts instead of being caulked).

In the figures, an prime mark ['] is added to the numerals assigned to the receptacle housing 50', the receptacle fixing plates 80' and 80', and the other parts of the receptacle connector half 9 whose configurations are different from those of the receptacle housing 50, etc. of the receptacle connector half 5. The other parts of the receptacle connector half 9 which are physically identical with those of the receptacle connector half 50 are given the same numerals, and no detailed description is given here. FIG. 12 shows a sectional view of the receptacle connector half 9 without any power transmission contact being engaged with the plug connector half 1, and this figure corresponds with the view taken along line V—V in FIG. 3 of the receptacle connector half 5 with power transmission contacts being engaged with the plug connector half 1.

In this receptacle connector half 9 without any power transmission contact, nothing is provided in the power contact retaining slots 57. Thus, only the receptacle contacts 60 and 60' are soldered to the printed circuit board of the CD-ROM drive. This CD-ROM drive, to be used as an external storage device, is attached to the laptop computer C by mating the receptacle connector half 9 of the CD-ROM drive with the plug connector half 1 of the laptop computer. In this receptacle connector half 9 without any power transmission contact, the power contact retaining slots 57 are accommodation spaces for the plug power transmission contacts, which are mentioned in claims.

When the plug and receptacle connector halves 1 and 9 are mated, the plug contacts 20 and the receptacle contacts 60 and 60' are brought into contact, establishing the connections for signal transmission between the laptop computer C and the CD-ROM drive. In this engagement, nothing comes into contact with the plug contacts 30 for power transmission, so no adverse effect is observed on the power lines of the laptop computer C. Furthermore, the plug contacts 30 for power transmission in this condition, i.e., without any electrical connection, are accommodated in the power contact retaining slots 57 of the receptacle connector half 9 and are not exposed to the outside of the connector assembly. As a result, the plug contacts 30 for power transmission are protected not only against any unfavorable electrical effect but also against any external force.

In the above connector halves 1, 5 and 9, through-holes are provided in the flat portions 41 and 81 of the fixing plates 40, 80 and 80' for the purpose of mounting the connector halves on circuit boards. However, instead of these through-holes, the flat portions 41 and 81 may be tapped after the burring process. If the connector halves are to be soldered to the respective circuit boards, then these through-holes or tapped holes are not necessary.

Figure 16:
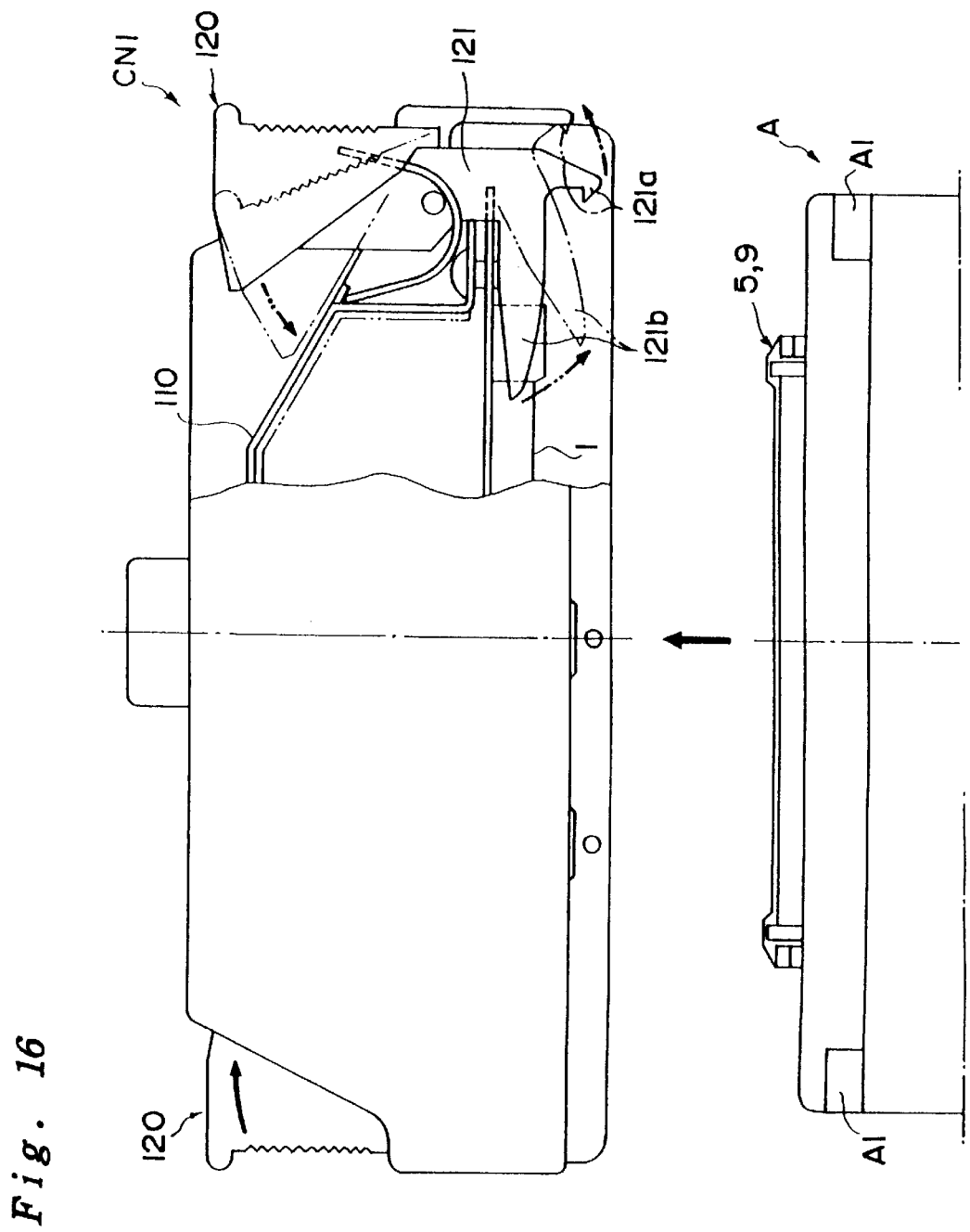
FIG. 16 shows a plan view of an attachment and an eject or lock type connector which utilize the connector assembly of the present invention.

The application of the plug connector half 1 is not limited to laptop computers C. As shown in FIG. 2 and 16, the plug connector half may be applied to an eject or lock connector CN1 used for an attachment connection cord CO. In this case, the other end of the attachment connection cord CO is provided with a connector CN3 which is matable with the connector CN2 which is provided on a side of the laptop computer C for the connection of an additional attachment.

This eject or lock connector CN1 comprises a shell 110 incorporating the plug connector half 1, which is matable with the receptacle connector halves 5 and 9, and a pair of lock levers 120 and 120. Lock levers 120 each including an ejector 121 are located at the right and left of the plug connector half 1 and are fixed to the shell 110. Moreover, each ejector 121 has a thruster 121b.

These lock levers 120 are pivotable between the lock position shown in real line and the release position indicated in dotted line. In the lock position, the locking nails 121a of the lock levers engage with locking slots Al which are provided in the attachment A. When the lock levers are swung from the lock position to the release position, the eject or lock connector CN1 is released from the engagement with the receptacle connector half 5 or 9.

With this eject or lock connector CN1, even if the attachment receiving space CA of the laptop computer C is already occupied by one of the attachments A, an additional attachment A can be connected to the laptop computer. In this way, the eject or lock connector CN1 incorporating the plug connector half 1, which has the plug contacts 30 for power transmission, enables connection to a power source when an attachment which is equipped with the receptacle connector half 5 with power transmission contacts is mated. When this eject or lock connector CN1 is mated with an attachment equipped with the receptacle connector half 9 without any power transmission contact, the plug contacts 30 for power transmission of the eject or lock connector is protected against any electrical and physical, unfavorable effect, in the accommodation spaces of the receptacle connector half of the attachment. Moreover, the receptacle connector half 9 without any power transmission contact can be produced cost-effectively because most parts are common with the receptacle connector half 5 with power transmission contacts.

The invention being thus described, it will be obvious that the same may be varied in many ways. Such variations are not to be regarded as a departure from the spirit and scope of the invention, and all such modifications as would be obvious to one skilled in the art are intended to be included within the scope of the claims.

What is claimed is:

1. An electrical connector comprising:
   a plug connector half having a plurality of vertically extending plug contacts for signal transmission which are retained in a laterally extending row and plug contacts for power transmission which are positioned next to lateral ends of said row of said plug contacts for signal transmission in a plug housing, the plug connector half being retained in an attachment receiving space of a main electrical device for selectively connecting the main device with a plurality of alternative attachments; and a first receptacle connector half and a second receptacle connector half each having a plurality of vertically extending receptacle contacts for signal transmission which are retained in a laterally extending row in a receptacle housing and having accommodation spaces which are located next to the lateral ends of said row of the receptacle contacts for signal transmission, said accommodation spaces being for receiving said plug contacts for power transmission; said first receptacle connector half and said second receptacle connector half being applied to a first attachment and to a second attachment respectively, the attachments having substantially identical outside dimensions and being selectively receivable alternately in said attachment receiving space so that a respective receptacle connector half mates with the plug connector half wherein said first receptacle connector half has power transmission contacts having receptacle contacts for power transmission in said accommodation spaces, said receptacle contacts for power transmission being capable of establishing electrical connection with said plug contacts for power transmission upon engagement, and said second receptacle connector half being without any power transmission contact whose accommodation spaces are left vacant to freely accept said plug contacts for power transmission which are inserted therein whereby the main device equipped with said plug connector half can be connected with a plurality of attachments alternatively through said receptacle connector half; and said receptacle connector half with power transmission contacts or said receptacle connector half without any power transmission contacts is applied to each one of said attachments in accordance with their different functions.

2. The electrical connector set forth in claim 1 wherein said main device is a computer; and said attachments are such devices as external memory device and battery pack which are optionally connected to said computer.

3. A portable computer assembly comprising a main processing device and first and second modular auxiliary devices having substantially identical external dimensions for mounting alternatively on the main device;

the main device having an auxiliary device receiving space and a plug connector mounted in the auxiliary device receiving space, the plug connector being provided with a row of plug signal transmission contacts and plug power transmission contacts at respective opposite ends of said row;

the first and second auxiliary devices having, respectively, first and second receptacle connectors provided, respectively, with identical insulating housings mounting rows of receptacle signal transmission contacts and having housing cavities suitable for accommodating receptacle power transmission contacts at respective opposite ends of said rows;

receptacle power transmission contacts occupying respective housing cavities of said first auxiliary device and respective housing cavities of said second auxiliary device being vacant;

whereby, when said first auxiliary device is mounted to the main processing device by receipt in the auxiliary device receiving space, the signal contacts and power contacts of their respective connectors are in mating engagement for signal and power transmission between the first auxiliary device and the main processing unit, and when said second first auxiliary device is mounted to the main processing device by receipt in the auxiliary device receiving space, the signal contacts of their respective connectors mate for signal transmission between the auxiliary device and the main processing unit and the plug power transmission contacts are freely received in the respective vacant cavities of said second auxiliary device.

* * * * *